United States Patent [19]
Akagi

[11] Patent Number: 5,049,459
[45] Date of Patent: Sep. 17, 1991

[54] FUEL CELL
[75] Inventor: Kousuke Akagi, Osaka, Japan
[73] Assignee: Osaka Gas, Co., Ltd., Osaka, Japan
[21] Appl. No.: 495,275
[22] Filed: Mar. 16, 1990
[30] Foreign Application Priority Data Jul. 7, 1989 [JP] Japan ................................. 1-176569
Sep. 6, 1989 [JP] Japan ................................. 1-231912

[51] Int. Cl.⁵ .............................................. H01M 8/04
[52] U.S. Cl. ........................................ 429/33; 429/38; 429/40
[58] Field of Search ....................... 429/34, 38, 39, 26, 429/33, 30, 40

[56] References Cited
U.S. PATENT DOCUMENTS 4,169,917 10/1979 Baker .................................. 429/34 X
4,365,007 12/1982 Maru et al. ........................ 429/34 X
4,574,112 3/1986 Breault et al. ......................... 429/26
4,770,955 9/1988 Ruhl ..................................... 429/33
4,824,740 4/1989 Abrams et al. .................... 429/26 X
4,883,497 11/1989 Claar et al. ......................... 429/33 X Primary Examiner—Anthony Skapars
Attorney, Agent, or Firm—Gifford, Groh, Sprinkle, Patmore and Anderson

[57] ABSTRACT

A fuel cell having an electrolyte layer, an oxygen electrode attached to one face of the electrolyte layer, a fuel electrode attached to the other face of the electrolyte layer, a separator formed of electrically conductive material and disposed in opposition to the oxygen electrode to be electrically connected therewith, an oxygen-containing gas flow passage formed between the oxygen electrode and the separator, and a conductive member disposed in the oxygen-containing gas flow passage. The conductive member is formed of flexible material and separately from the oxygen electrode and the separator for connecting entire or partial faces respectively of the oxygen electrode and the separator with each other.

18 Claims, 9 Drawing Sheets

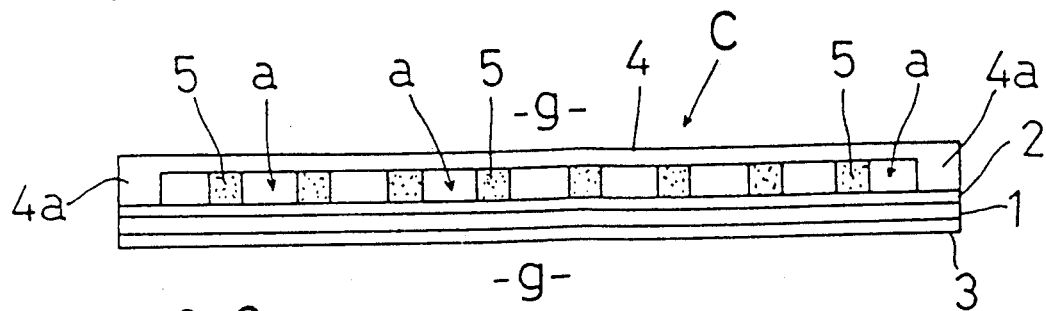
FIG. 1
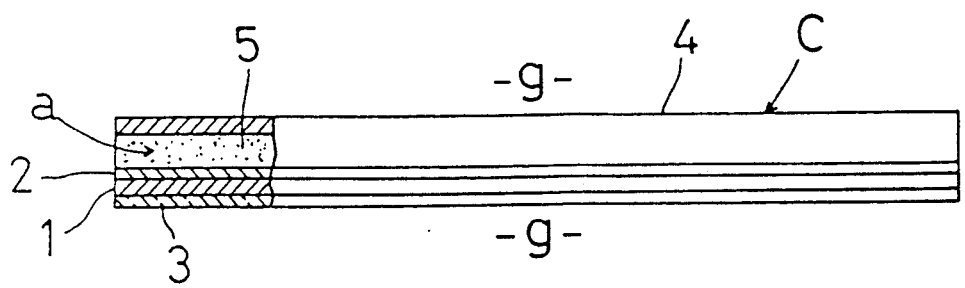
FIG. 2
FIG. 3
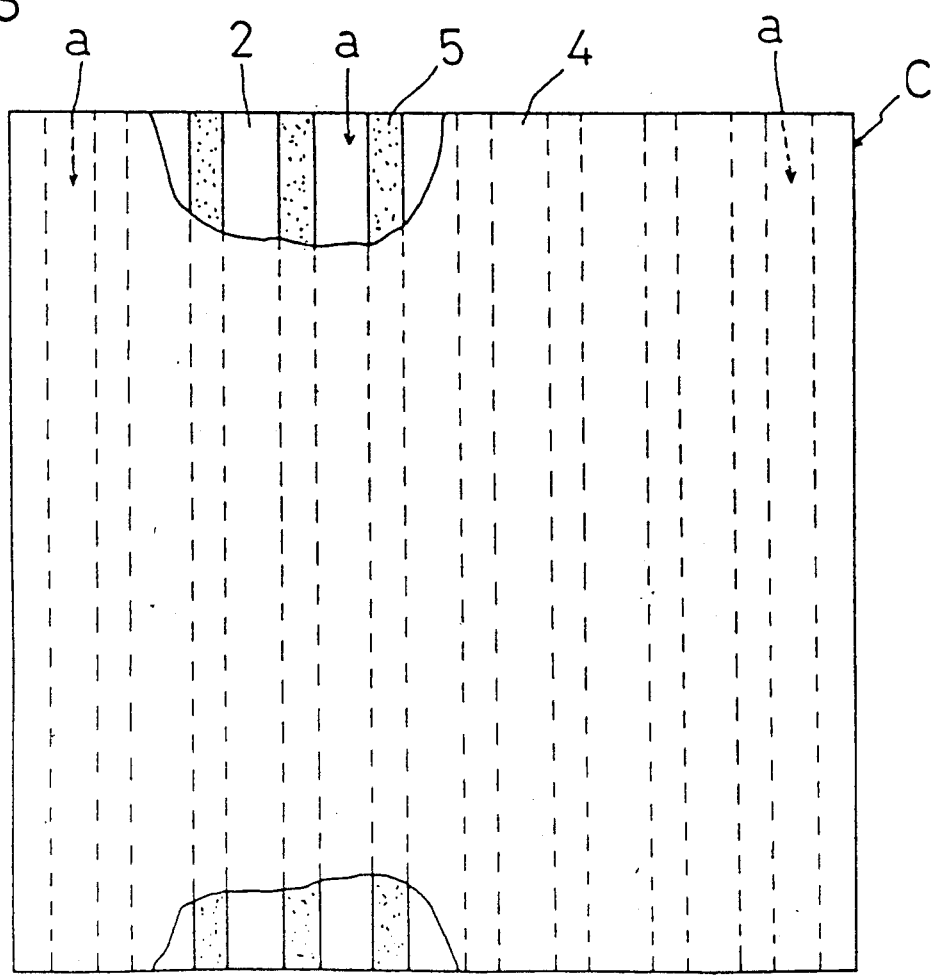

FUEL CELL

BACKGROUND OF THE INVENTION

1 Field of the Invention

The present invention relates to a fuel cell, and more particularly to a fuel cell including a solid electrolyte layer, an oxygen electrode attached to one face of the electrolyte layer, a fuel electrode attached to the other face of the electrolyte layer and a conductive separator provided to be electrically connected with the oxygen electrode.

2 Description of the Prior Art

In a known flat plate type fuel cell of the above-noted type, as illustrated in FIG. 15, an oxygen electrode 2 (or a fuel electrode 3) or a separator 4 integrally forms a plurality of ribs 7 thereon for sectioning into a plurality of flow passages an oyxgen-containing gas flow passage 'a' (or a fuel flow passage 'g') between the oxygen electrode 2 (or the fuel electrode 3) and the separator 4. Then, as the oxygen electrode 2 (or the fuel electrode 3) and the opposing separator 4 are connected with each other through the plurality of ribs 7, the electricity flow passage between the electrode 2 or 3 and the conductive separator 4 may be enlarged in area.

Incidentally, the separator 4 functions not only as a sectioning means for sectioning the oxygen-containing gas flow passage 'a' (or the fuel flow passage 'g') into a plurality of passages but also as a cell terminal for obtaining electric current from the oxygen electrode 2 (or the fuel electrode 3) facing the oxygen-containing gas flow passage 'a' (or the fuel flow passage 'g'). Reference numeral 1 in FIG. 15 denotes an electrolyte layer.

However, if the oxygen electrode, fuel electrode, separator and the electrolyte layer are formed respectively of a thin plate element or a film element (a very thin film having a thickness in the order of some microns), the cell construction becomes extremely minute and complicated, whereby a very high manufacturing precision will be needed. Then, if the above-described construction is employed for such case, it is technically very difficult to form the plurality of ribs integrally with the electrode or the separator so that all the ribs may provide proper electrical connection. Therefore, this conventional construction has often proved infeasable such case.

Further, when the fuel cell is under operation for electricity generation, there occurs thermal strain between the oxygen electrode (or the fuel electrode) and the separator because of the rigidity of the construction. Then, again if the oxygen electrode, fuel electrode, separator and the electrolyte layer are formed respectively of a thin plate or film element to make up the conventional construction and the oxygen or fuel electrode and the separator are rigidly connected with each other through the ribs, thermal strain acts on the thin and weak plate or film elements, whereby quality is reduced, hence, performance deterioration or even damage in the cell construction occurs.

With view to the above-described shortcomings of the prior art, the primary object of the present invention is to provide an improved fuel cell free from the above-described problems even if its structure elements such as the oxygen electrode, fuel electrode, separator and the electrolyte layer are formed respectively of a thin plate or film element.

SUMMARY OF THE INVENTION

In order to accomplish the above-noted object, a fuel cell relating to a first preferred embodiment of the present invention, comprises: an electrolyte layer; an oxygen electrode attached to one face of the electrolyte layer; a fuel electrode attached to the other face of the electrolyte layer; a separator formed of electrically conductive material and disposed in opposition to the oxygen electrode to be electrically connected therewith; an oxygen-containing gas flow passage formed between the oxygen electrode and the separator; and a conductive member disposed in the oxygen-containing gas flow passage, the conductive member being formed of flexible material and separately from the oxygen electrode and the separator for connecting entire or partial faces respectively of the oxygen electrode and the separator with each other.

Further, a fuel cell relating to a second preferred embodiment of the present invention, comprises: an electrolyte layer; an oxygen electrode attached to one face of the electrolyte layer; a fuel electrode attached to the other face of the electrolyte layer; a separator formed of electrically conductive material and disposed in opposition to the fuel electrode to be electrically connected therewith; a fuel flow passage formed between the fuel electrode and the separator; and a conductive member disposed in the fuel flow passage, said conductive member being formed of flexible material and separately from the fuel electrode and the separator for connecting entire or partial faces respectively of the fuel electrode and the separator with each other.

With the above-described characterizing fuel cell constructions of the invention, in the oxygen-containing gas flow passage (or the fuel flow passage in the second embodiment) for partially connecting the opposed pair of the separator and the oxygen electrode (the fuel electrode in the second embodiment), a plurality of the conductive members are provided apart from each other. And, since each of these conductive members is formed of flexible material and separately from the separator and the oxygen electrode (or the fuel electrode), the manufacture of the separator and the oxygen electrode (or the fuel electrode) has become very easy. Further, the flexibility of the conductive member serves to absorb manufacturing tolerance if any. Thus, it is easy to maintain proper electrical connection between the separator and the oxygen electrode (or the fuel electrode).

The flexibility of the conductive member also serves to absorb the aforementioned thermal strain occuring during operation of the fuel cell. Accordingly, compared with the conventional construction where the separator and the oxygen electrode (or the fuel electrode) are rigidly connected with each other through the ribs, the fuel cell construction of the present invention is more resistant against quality deterioration or damage of the construction due to repeated thermal expansion and contraction. Consequently, the fuel cell of the invention provides an extended period of service life.

According to a further embodiment of the present invention, the conductive member is formed of La compound, or preferably of a felt material of LaMnO$_3$ or of Ni-based alloy or of Co-based alloy. These kinds of material are all superior in the anti-oxidation property in oxidizing atmosphere. Therefore, the invention's fuel cell accorded with this additional feature will achieve excellent durability against oxidation and reliable maintenance of the performance of the flexible conductive member.

Moreover, if the Ni-based alloy or the Co-based alloy is employed for forming the conductive member, a further advantage will accrue. That is, as the cell temperature becomes even and uniform, the cell will achieve improved electricity generation performance and also improved durability. Further, as the oxygen-containing gas will provide greater cooling effect per unit, the total feed amount of the oxygen-containing gas may be reduced. Consequently, a heat exchanger used for providing pre-heating effect by the exhausted oxygen-containing gas may be formed smaller, and the heat loss due to gas exhaustion will be advantageously reduced.

In addition, in the cell construction of the second embodiment of the present invention, the conductive member is disposed in the fuel flow passage having oxidizing atmosphere. Then, if the conductive member is formed of a felt material of Ni (including both pure metal and alloy), since the Ni-based felt member has good corrosion resistance against oxidizing atmosphere as described above, the entire cell will achieve improved durability against oxidation, and the flexible conductive member can perform properly for an extended period of time.

In any one of the abov-described cell constructions of the present invention, if the separator is formed of $LaCrO_3$, the separator acquires high corrosion resistance in both high temperature oxidizing atmosphere of the oxygen-containing gas flow passage and high temperature reducing atmosphere of the fuel flow passage. Accordingly, the fuel cell having this separator will achieve further improvement in its durability because of the increased oxidation resistance and oxidation-reduction resistance and can perform properly as a cell terminal for an extended period of time.

According to one advantageous feature of the present invention, in any one of the above-described cell constructions of the invention, the electrolyee layer comprises a plate element formed of $ZrO_2$ (preferrably having tetragonal structure) with solid solution of Yt (preferably, not less than 2 mol % and not more than 4 mol %). $ZrO_2$ with solid solution of Yt has good mechanical strength. Accordingly, the fuel cell using such electrolytee layer in its multi-layered construction formed of a plurality of thin plate or film elements also will achieve superior mechanical strength. Further, with such increased mechanical strength of the electrolyee layer, the manufacture of the cell construction will be also facilitated, since the multi-layered assembly can be easily formed by affixing the oxygen electrode, the fuel electrode, the flexible conductive member and the separator one after another on the electrolee layer.

According to another advantageous feature of the invention, the oxygen electrode is formed of La compound while the fuel electrode is formed of cermet of Ni and $ZrO_2$. That is, the oxygen electrode, which faces the oxygen-containing gas flow passage having the oxidizing atmosphere, acquires good oxidation resistance because of its La compound content. Whereas, the fuel electrode, which faces the fuel flow passage, acquires good oxidation-reduction resistance because of its cermet of Ni and $ZrO_2$.

According to still another advantageous feature of the invention, a water-cooling pipe is disposed in the oxygen-containing gas flow passage or the fuel flow passage. As the water-cooling pipe effectively cools the cell construction, it becomes possible to significantly reduce the feed amount of the oxygen-containing gas down to an ideal amount essential for electricity generation, and the gas exhaust amount can be significantly reduced accordingly.

That is to say, with such significant reduction in the feed amount and exhaust amount of the oxygen-containing gas, it becomes possible to form compact and inexpensive the heat exchanger used for pre-heating process of the oxygen-containing gas by means of the exhaust gas. As a result, the entire system will achieve cost reduction and installation space reduction. Moreover, with the great reduction of the exhaust gas, damage by exhaust heat can be minimized, such that the thermal efficiency will improve and running costs will be reduced.

According to a still further feature of the invention, a felt type conductive member is disposed in the oxygen-containing gas flow passage or the fuel flow passage so as to be exposed to the fuel electrode, separator and also to the water-cooling pipe. With this feature, it becomes possible to attach the water-cooling pipe to the cell by the effect of the conductive member and also to promote heat conduction from the oxygen electrode or the fuel electrode to the water-cooling pipe thereby advantageously enlarging the section area of the electicity flow passage formed between the oxygen electrode or the fuel electrode and the separator.

According to a still further feature of the present invention, the water-cooling pipe is attached to the cell by means of the conductive member and the cooling pipe is formed as a winding pipe. With this feature, the manufacture of the cell construction will be greatly facilitated, as compared e.g. with a case where a plurality of straight water-cooling pipes are supported by means of a header inside the cell construction. Further, with the aid of the heat-conduction promoting effect of the conductive member, the water-cooling pipe can cool the oxygen electrode or the fuel electrode more efficiently. Moreover, because of the increased cross section area of the electricity passage by the effect of the conductive member, a plurality of cells may be connected in series with each other by using the separators. As a result, the entire fuel cell assembly can collect electric power more efficiently.

In summary, the present invention has fully achieved its intended object of providing an improved fuel cell which is economical in installation and running and is compact and also which is superior in cooling performance and electricity collecting performance.

Further and other objects, features and effects of the invention will become apparent from the following more detailed description of the embodiments of the invention with reference to the accompanying drawings.

BRIEF DESCRIPTION OF THE DRAWINGS

Accompanying drawings FIGS. 1 through 14 illustrate preferred embodiments of a fuel cell relating to the present invention; in which, FIG. 1 is a front view of a fuel cell according to one embodiment of the invention, FIG. 2 is a partially cutout side view of the fuel cell, FIG. 3 is a partially cutout plane view of the fuel cell, FIG. 4 is an exploded perspective view of the fuel cell, FIG. 5 is a front view illustrating a multi-layered inner construction of the fuel cell, FIG. 6 is a side view illustrating the multi-layered inner construction of the fuel cell, FIG. 7 is a front view illustrating an assembly consisting of a plurality of the multi-layered inner constructions of the fuel cell, FIG. 8 is a partially cutout perspective view showing a fuel cell according to another embodiment of the present invention, FIG. 9 is a perspective view of a multi-layered inner construction of the fuel cell of FIG. 8, FIG. 10 is a partially cutout perspective view showing a fuel cell according to still another embodiment of the present invention, FIG. 11 is a cross section of a fuel cell assembly, FIG. 12 is a section view taken along a line 12—12 of FIG. 11, FIG. 13 is a section view taken along a line 13—13 of FIG. 11, FIG. 14 is a partially cutout perspective view showing a fuel cell according to a still further embodiment of the present invention.

DESCRIPTION OF THE PREFERRED EMBODIMENTS

Figure 4:
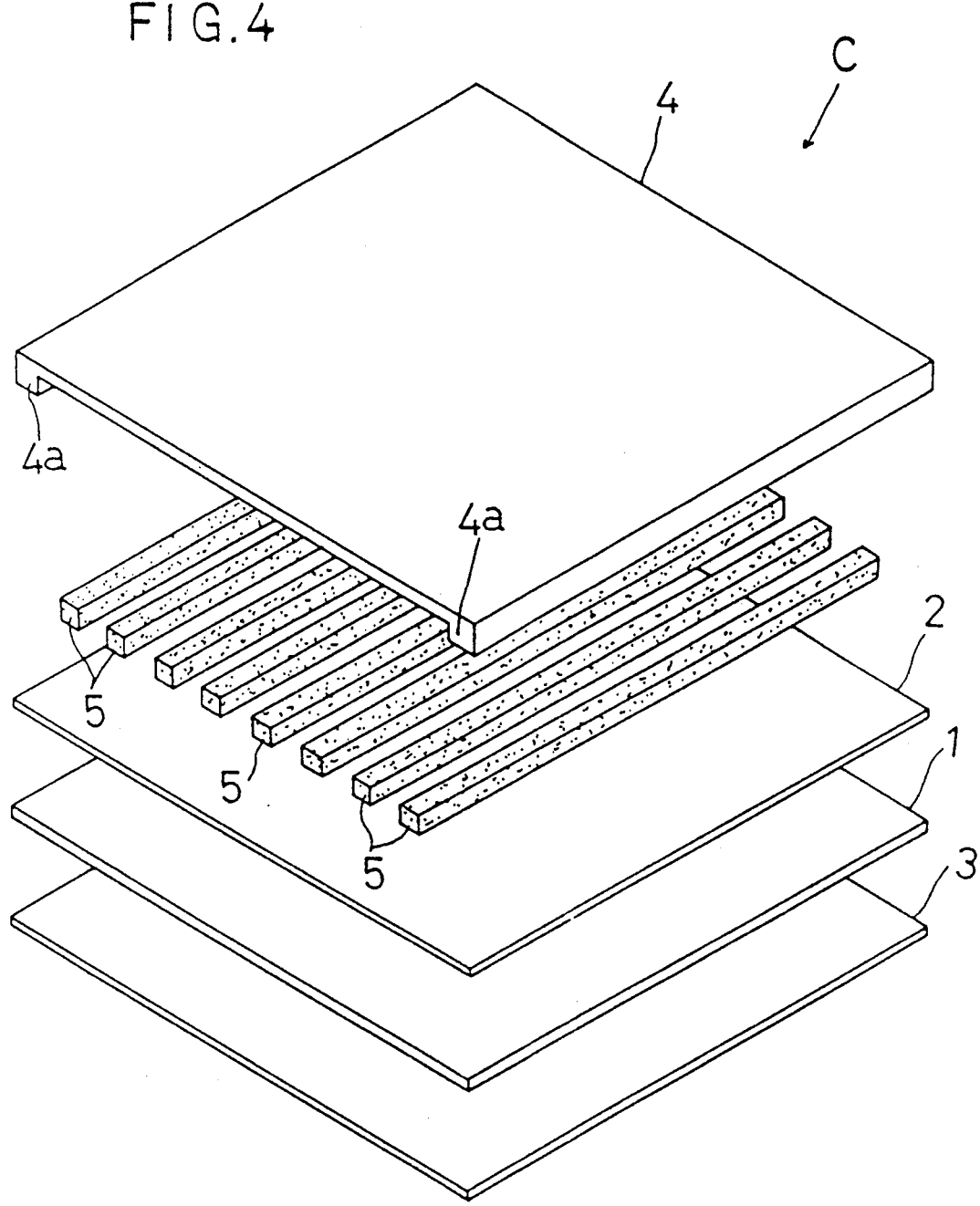

Preferred embodiments of a fuel cell relating to the present invention will be particularly described hereinafter with reference to the accompanying drawings.

FIGS. 1 through 4 illustrate a construction of a fuel cell C (single cell). This fuel cell C includes, as its electricity generating unit, a three-layered construction consisting of a plate type solid electrolyce layer 1, a film or plate type air electrode (oxygen electrode) 2 affixed to one face of the electrolyce layer 1 and of a film or plate type fuel electrode 3 affixed to the other face of the electrolyce layer 1.

Further, a separator 4 is attached to the above electricity generating unit in such a manner as to oppose to the air electrode 2, and there is formed an air flow passage 'a' (oxygen-containing gas flow passage) between the separator 4 and the air electrode 2.

The separator 4 integrally includes, at its opposed side edges, band ridges 4a for each to be connected with a side edge of the air electrode 2 opposing thereto. Accordingly, as these band ridges 4a seal the side edges of the air flow passage 'a', an entire periphery of the cell construction along the air flow passage 'a' is formed as a fuel flow passage 'g' separated from the air flow passage 'a'.

The separator 4 functions not only as a sectioning means for sectioning the air flow passage 'a' but also as a cell terminal for obtaining electric current from the air electrode 2 opposing the air flow passage 'a'. In the air flow passage 'a', there are dispersed, in parallel with the flow direction of the air flow passage 'a', a plurality of band-shaped conductive members 5 for providing partial connection between the separator 4 and the air electrode 2. As these band-shaped conductive members 5 connect the separator 4 with the air electrode 2 at a plurality of points, there is formed an electric current passage having a large area between the air electrode 2 and the separator 4.

The band-shaped conductive member 5 is formed of such material as having good corrosion resistance in the air flow passage 'a' i.e. in the oxidizing atmosphere, for example, an La compound such as $LaMnO_3$, a Ni-based alloy or a Co-based alloy. Further, this material for forming the conductive member 5 is employed in the form of a felt type member so as to compensate possible manufacturing tolerance of the cell construction (i.e. irregularity in the distance between the air electrode 2 and the separator 4) and also to absorb thermal strain, i.e. difference in the thermal expansion rates between the air electrode 2 and the separator 4.

On the other hand, the separator 4 facing both the inner air flow passage 'a' and the fuel flow passage 'g' disposed peripherally of the passage 'a', is formed of $LaCrO_3$ which has good corrosion resistance against the oxidizing atmosphere and against oxidation-reduction atmosphere and high conductivity as the cell terminal as well. The air electrode 2 is formed of $LaMnO_3$ and the fuel electrode 3 is formed of cermet of Ni and $ZrO_2$.

The electrolytic layer 1 is formed of $ZrO_2$ having a tetragonal structure with solid solution of Yt in the approximate order of 3 mol %. This electroly layer 1 acts as a core member for assuring mechanical strength of the entire multi-layered construction of the cell.

Figure 5:
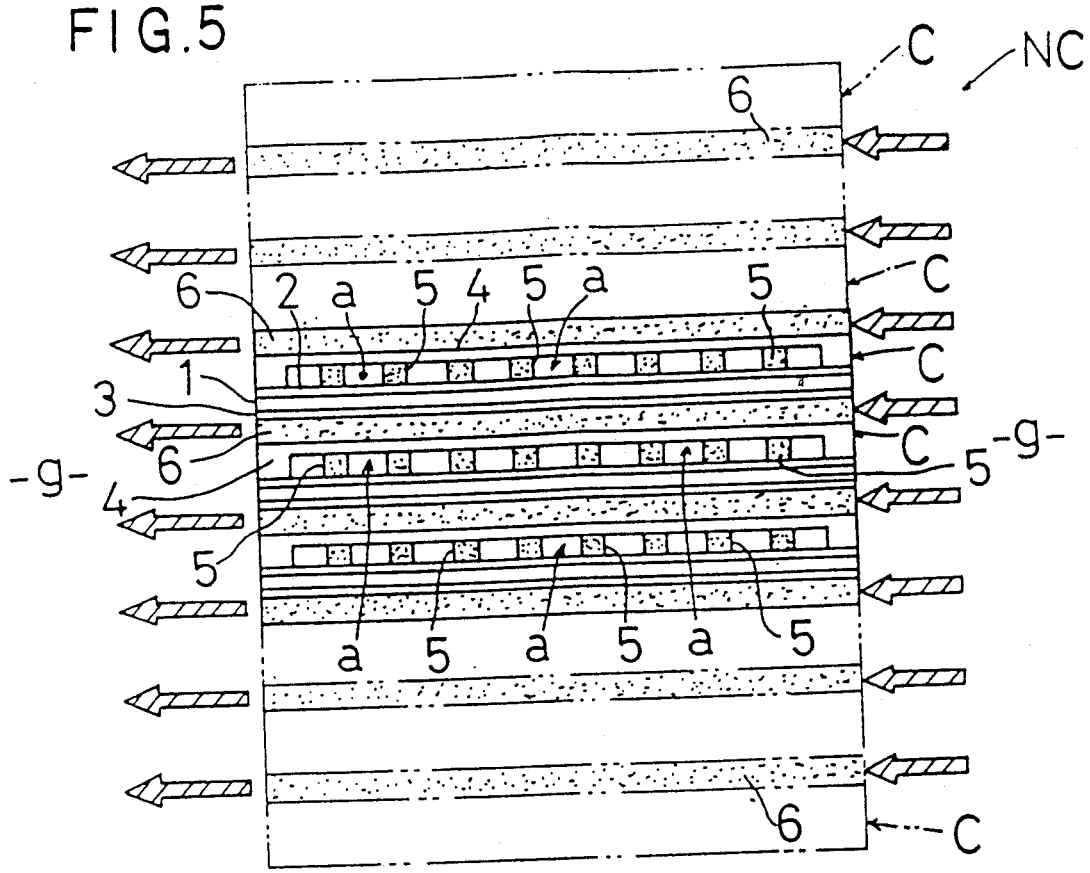
Figure 6:
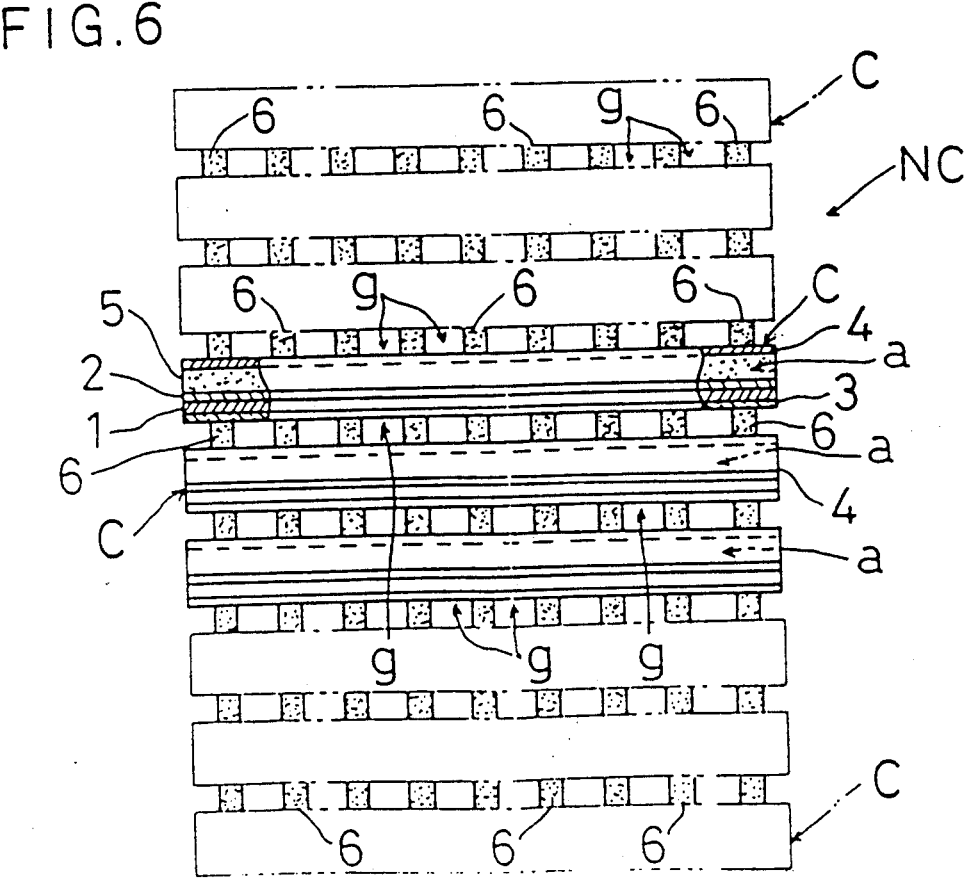

FIGS. 5 and 6 illustrate a cell assembly consisting of a plurality of the fuel cells C each having the above-described construction. In this assembly, the fuel electrode 3 of one of an adjacent pair of cells C is positioned in opposition to the separator 4 of the other cell C of the pair, and further a band-shaped interposing member 6 is provided between the adjacent cells C so as to partially connect between the opposing fuel electrode 3 and the separator 4. Then, a plurality of the above assemblies are placed one on the other, with the interposing members 6 between the cells C forming the fuel flow passage 'g'.

Each interposing member 6 is formed of conductive material. Accordingly, these interposing members 6 function not only to form the fuel flow passages 'g' between the cells C but also to electrically connect the fuel electrode 3 of one cell C with the separator 4 of another cell C opposing thereto. As a result, the plurality of cells C layered one on another are electrically connected in series with each other without any special electric connection means therebetween.

By appropriately determining the number of layers of the multi-layered construction, the cell assembly can provide a desired electric potential.

Further, the interposing member 6 is formed of a felt type conductive material which can advantageously absorb manufacturing tolerance of the multi-layered cell construction (i.e. irregularities in the inter-layer distance) or thermal strain resulting from repeated thermal expansion and contraction of the assembly during electricity generating operation.

Such felt type conductive material for forming the interposing member 6 comprises e.g. felt material of Ni which is advantageous for its corrosion resistance against oxidation-reducing atmosphere.

In the multi-layered cell construction, the cells C are so arranged that the air flow passages 'a' may be oriented in the same direction. On the other hand, the band-shaped interposing members 6 betewen the layers are arranged normal to the air flow passages 'a'. That is, at opposed sides of the multi-layered construction relative to the longitudinal direction of the interposing members 6, an air feed chamber acting like a header communicated with the respective air flow passages 'a' and an air exhaust chamber are disposed separately from each other at the respective opposite sides. Whereas, the fuel flow passages 'g' formed between adjacent pair of cell layers extend along the longitudinal direction of the interposing members 6.

Incidentally, the fuel flow passages 'g' are formed as one continous passage communicating in series with each other at the opposite sides of the multi-layered cell construction. That is to say, with this construction of the invention, it is no longer necessary to form, inside the multi-layered cell construction of the fuel cell, a plurality of separate fuel flow passages which number corresponds to the number of the cell layers constituting the multi-layered construction. Consequently, the invention has achieved significant simplification of the internal construction of fuel cell.

Figure 7:
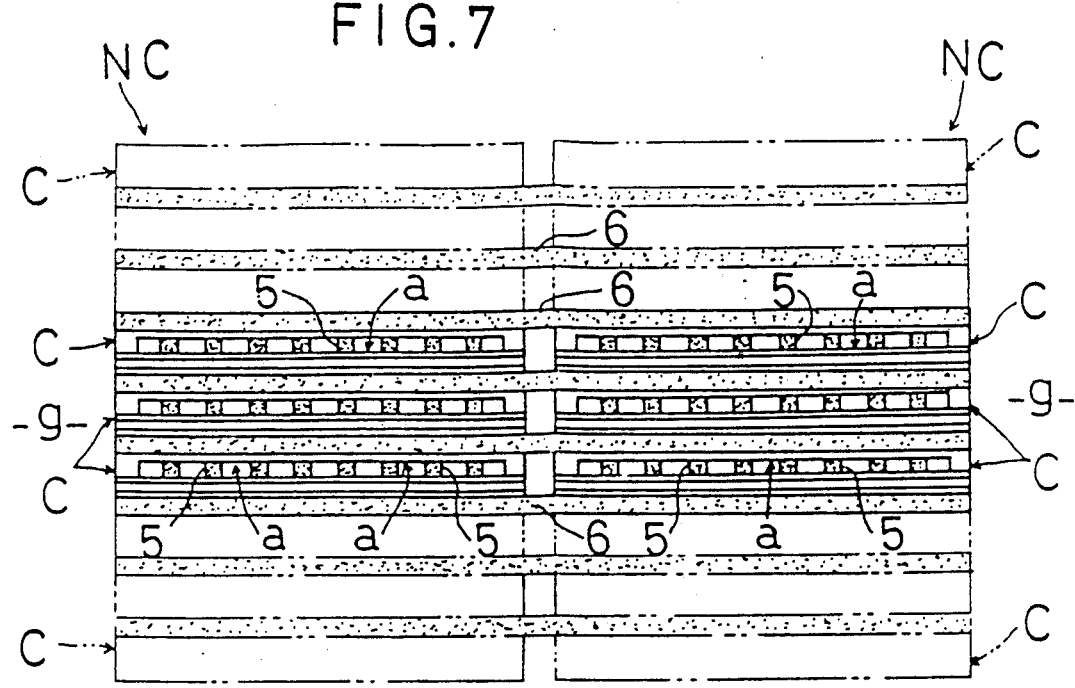

FIGS. 5 and 6 illustrate an assembly condition of a pair of the multi-layered cell constructions NC. In alignment of such plurality of multi-layered cell constructions NC for forming a fuel cell, it is conceivable, as illustrated in FIG. 7, to arrange these cell constructions NC such that the interposing members 6 of the respective corresponding layers of the constructions NC be connected continuously with each other.

Thus connected interposing members 6 each formed of the felt type conductive material serve to provide serial electric connection between adjacent cells C in each multi-layered cell construction NC. Whereas, as the corresponding interposing members 6 of the respective multi-layered cell constructions NC are connected continously with each other, these adjacent multi-layered cell constructions NC are electrically connected in parallel with each other. Then, by appropriately determining the number of the multilayered cell constructions NC to be connected in parallel with each other, it is possible to construct a fuel cell having a desired capacity.

Some alternate embodiments of the present invention will be specifically described next.

Figure 8:
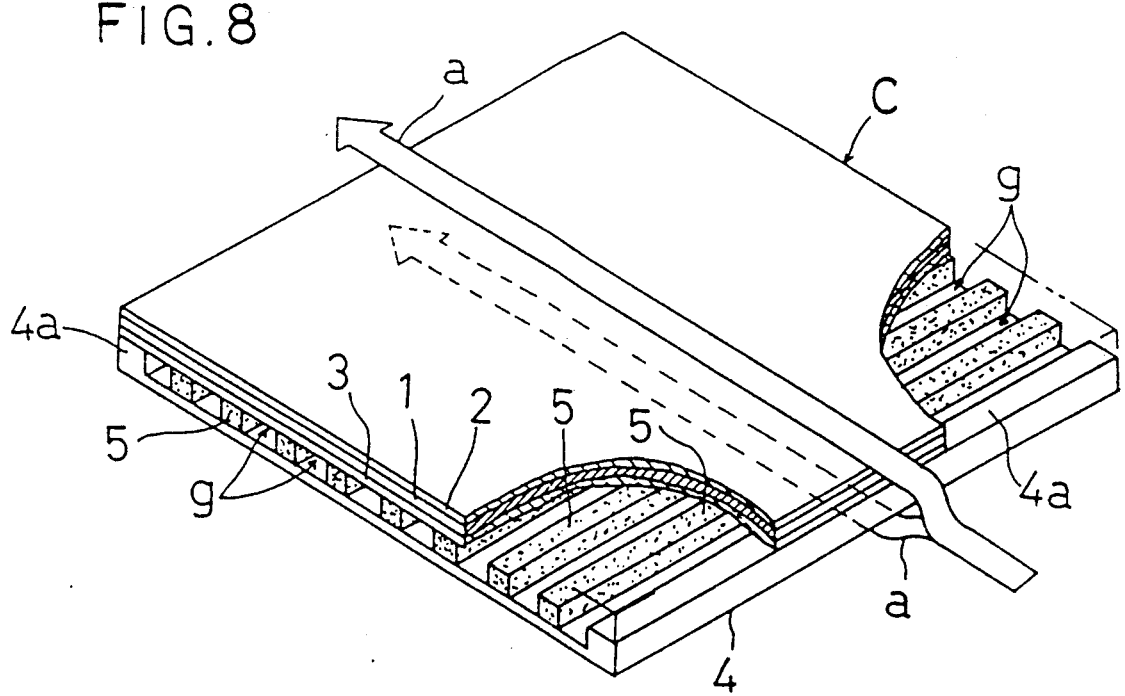

(i) In a first alternate embodiment of the invention, a cell C is constructed as illustrated in FIG. 8. This cell C includes an electricity generation unit comprised of a three-layered assembly consisting of the plate type electrolye layer 1, the film or plate type air electrode (oxygen electrode) 2 and the film or plate type fuel electrode 3. Further, the plate type separator 4 is attached to the electricity generating unit with the separator 4 being opposed to the fuel electrode 3. The fuel flow passage 'g' is formed between the separator 4 and the fuel electrode 3. Further, a plurality of conductive members 5 are dispersed in the fuel flow passage 'g' for partially connecting between the separator 4 and the fuel electrode 3. Each of these conductive members 5 can be formed of a flexible material (e.g. a felt material) as an entity separate from the separator 4 and the fuel electrode 3.

Incidentally, preferably, the above flexible material used for forming the conductive member 5 should have good corrosion resistance against oxidation-reducing atmosphere (e.g. a felt material of Ni).

(ii) In the construction of the above section (i), as illustrated in FIG. 8, it is conceivable to provide a pair of band-shaped ridges 4a to be connected with the opposed side edges of the fuel electrode 3 such that these band-shaped ridges 4a close the opposed side edges of the fuel flow passage 'g' thereby to separate this fuel flow passage 'g' from the outer air flow passage (oxygen-containing gas flow passage) 'a'.

(iii) The elements of the cell construction: the electrolye layer 1, the air electrode (oxygen electrode) 2, the fuel electrode 3 and the separator 4 can be formed of a variety of materials other than those disclosed in the foregoing embodiment. Also, the flexible conductive member 5 can be formed of any other appropriate material than the felt type conductive material disclosed in the foregoing embodiment.

Figure 9:
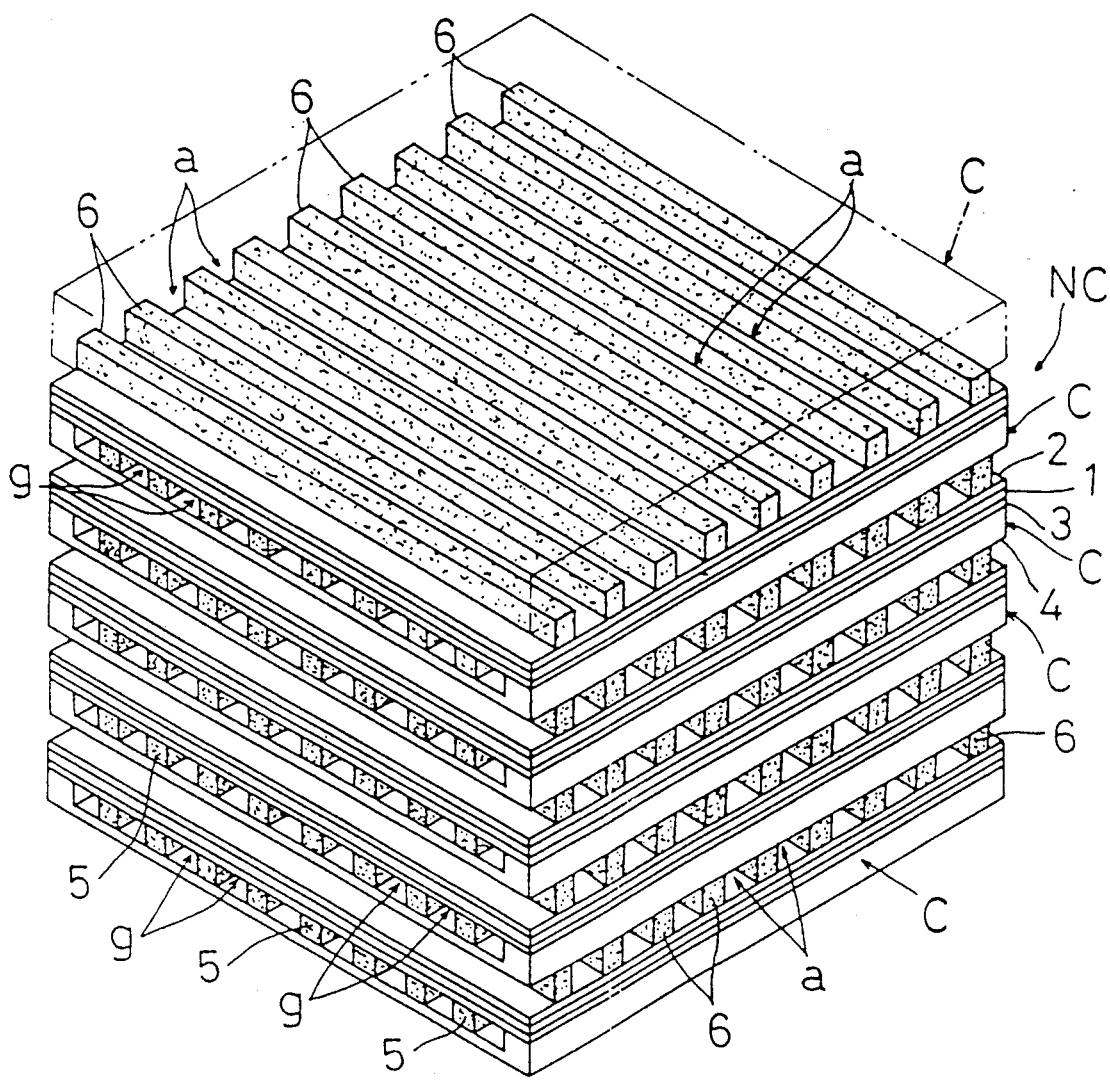
Figure 10:
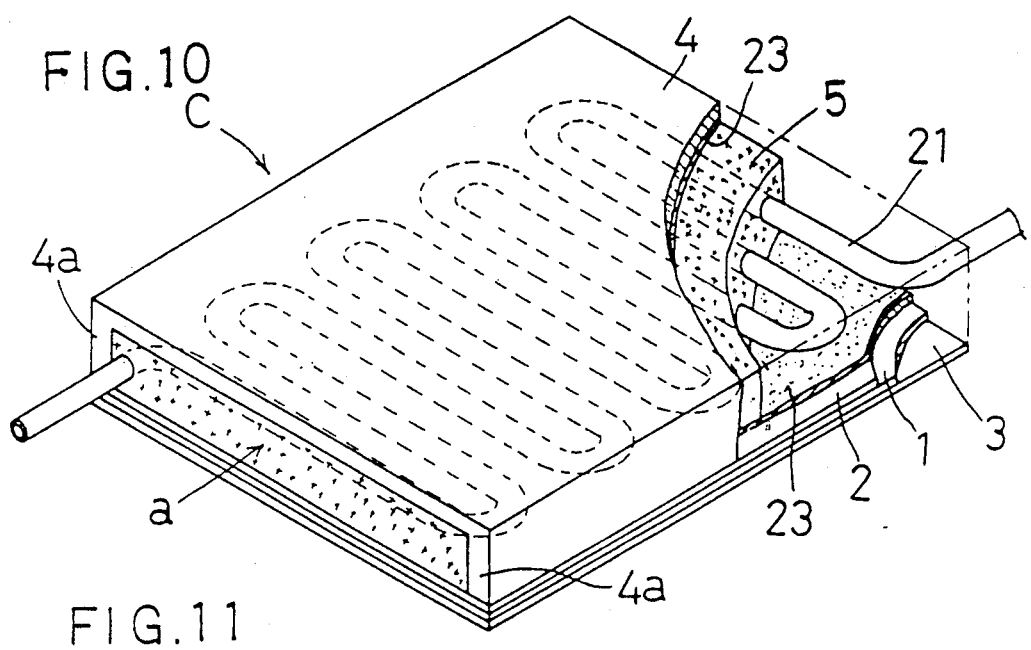
Figure 11:
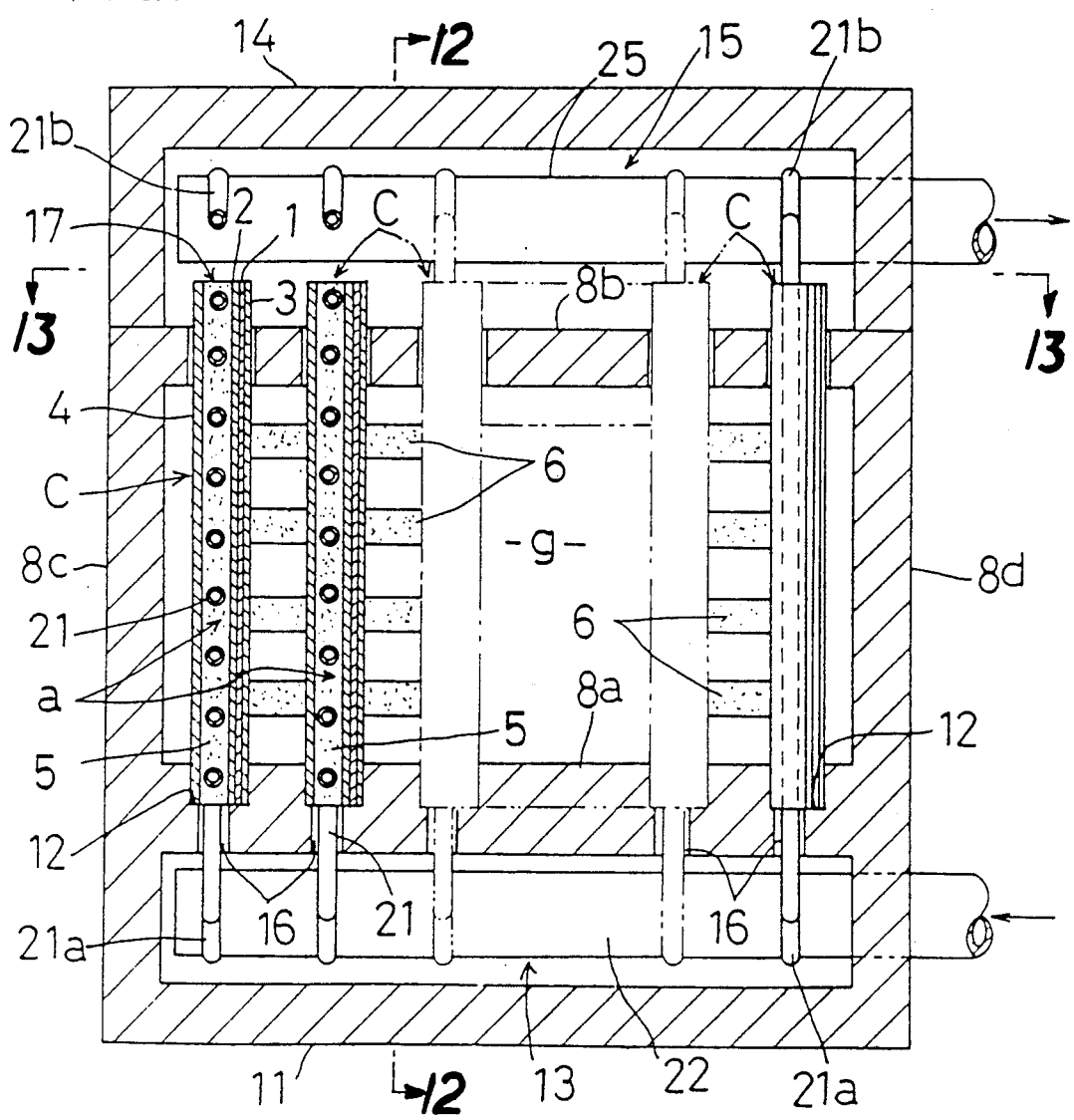
Figure 12:
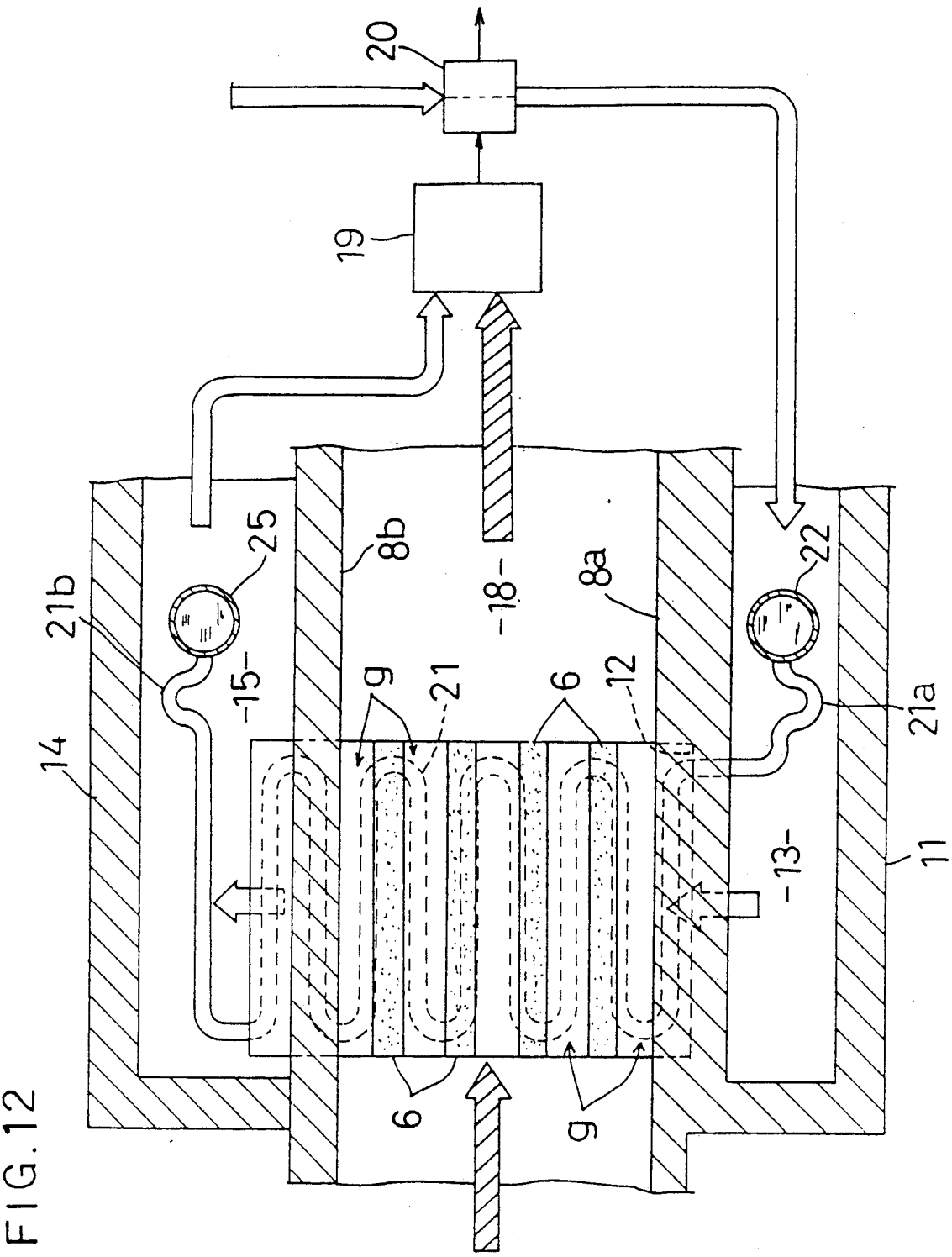
Figure 13:
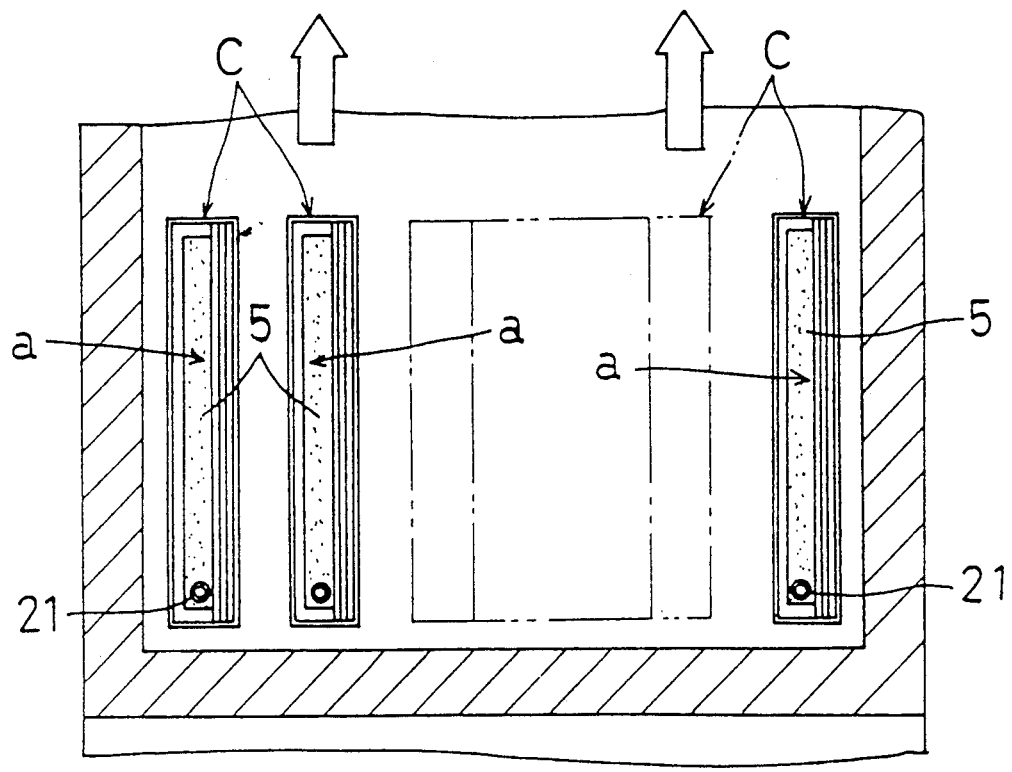

(iv) The multi-layered cell construction can be formed alternately by assembling a plurality of the cells C described in the above section (ii), as illustrated in FIG. 9. In this construction, the air electrode (oxygen electrode) 2 of one of an adjacent pair of cells C is placed in opposition to the separator 4 of the other cell C, and these air electrode 2 and the separator 4 are partially connected with each other through the interposing member 6. And, this interposing member 6 is formed of a flexible conductive material (e.g. a felt type conductive material) and the gaps between respective adjacent cells C are used as the air flow passages (oxygen-containing gas flow passages) 'a'.

In this case, it is preferred that the interposing member 6 be formed of a material having good corrosion resistance against oxidizing atmosphere (e.g. a felt material of $LaMnO_3$ or of $LaCrO_3$).

(v) It is conceivable to arrange as plurality of the multi-layered cell constructions described in the above section (iv) with the interposing members of the corresponding layers of the adjacent constructions being formed continuous with each other.

(vi) As the oxidizing agent, oxygen or oxygen-rich air can be employed in place of the air used in the foregoing embodiment. Therefore, in the present specification, these agents are generically referred to as the oxygen-containing gas.

Also, the reducing agent can vary depending on the convenience.

(vii) The specific shapes of the conductive member in the cell assembly and of the interposing member in the multi-layered cell construction are not limited to those disclosed in the foregoing embodiment.

(viii) The band-shaped ridge 4a of the separator 4 can be affixed to the plate type electrolye layer 1. Further, in the separator 4, the flat plate-shaped main portion and the band-shaped ridge 4a can be formed separately from each other.

A still further alternate embodiment will be described next with reference to FIGS. 10 through 13.

In the cell C of this embodiment, inside the oxygen-containing gas flow passage 'a', there are disposed a winding water-cooling pipe 21 and a flexible felt type conductive member 5 capable of absorbing thermal strain. The conductive member 5 is affixed to the oxygen electrode 2 and the separator 4 by means of a high-temperature resistant adhesive 23 such as of ceramics. With this construction, the conductive member 5 serves to retain the water-cooling pipe 21 and also to promote heat conduction from the oxygen electrode 2 to the water-cooling pipe 21, whereby there is formed an electricity passage having a large sectional area from the oxygen electrode 2 to the separator 4 acting as a cell terminal.

The conductive member 5 can be formed of a felt type metal material such as Ni alloy or Co-based alloy having good heat resistance and oxidation resistance.

A plurality of the cells C are vertically oriented and aligned side by side, such that the fuel flow passage 'g' is formed inside the cell assembly by partition walls 8a through 8d. Further, between adjacent cells C, there are provided the interposing members 6, and all the fuel poles 3 of the cells C are opposed to the fuel flow passage 'g' and all the cells C are serially connected with each other through the interposing members 6.

The partition walls 8a through 8d can be formed of such material as having good electricity insulating property and good heat insulating property.

The interposing member 6 can be formed of an appropriate material such as felt type Ni material having sufficient flexibility to absorb thermal strain and good corrosion resistance against oxidation reduction.

To each inlet opening of the oxygen-containing gas flow passage 'a' inside the cell C, there is connected, via a further flow passage 16, an oxygen-containing gas feed passage 13 formed downwardly of the fuel flow passage 'g' by the partition walls 8a and 11. Further, to each outlet opening of the oxygen-containing gas flow passage 'a', there is connected, via a flow passage 17, an exhaust passage 15 formed upwardly of the fuel flow passage 'g' by the partition walls 8b and 14.

Also, an exhaust passage 18 of the fuel flow passage 'g' and the exhaust passage 15 of the oxygen-containing gas flow passage 'a' are connected to a burner 19, and a heat exchanger 20 is provided for pre-heating the oxygen-containing gas to be fed to the oxygen-containing gas feed passage 13 up to approximately 600 degrees in Celsius by means of a high-temperature exhaust gas from the burner 19.

In operation, the oxygen-containing gas such as air, oxygen-rich gas or oxygen is pre-heated and fed to the oxygen-containing gas flow passage 'a' while a fuel gas as $H_2$ supply source is fed to the fuel flow passage 'g'. Electricity is generated by the function of the electrolyte layer 1 of the respective cell C and this electricity is collected from the serially connected cells C. Further, with the aid of the cooling effect of the water-cooling pipe 21, the cells C can be maintained at approximately 1,000 degrees in Celsius so that the cells C can constantly generate electricity efficiently.

At a recess 12 of the partition wall 8a sectioning between the fuel flow passage 'g' and the oxygen-containing gas feed passage 13, a lower end of the cell C is fixedly inserted, whereas, an upper end of the cell C is freely insertible to and withdrawable from the partition wall 8b sectioning between the fuel flow passage 'g' and the exhaust passage 15.

That is to say, the weight of the cell C per se effectively serves to seal the gap between the cell C and the partition wall 8a against leakeage therefrom. With this, any inadverent mixture of the fuel and the oxygen-containing gas can be advantageously avoided. Moreover, the above arrangement serves to absorb upward thermal distortion of the cell C, thereby effectively preventing breakage of the cell C and the partition walls 8a and 8b.

A water-supply header 22 for the water-cooling pipe 21 is provided inside the oxygen-containing gas feed passage 13, and adjacent this header 22, the water-cooling pipe 21 forms a curved portion 21a adapted for preventing thermal strain.

Inside the oxygen-containing gas exhaust passage 15, there is provided a water-recovering header 25 for the water-cooling pipe 21, and adjacent this header 25, the water-cooling pipe 21 forms a further curved portion 21b adapted for preventing thermal strain.

Figure 14:
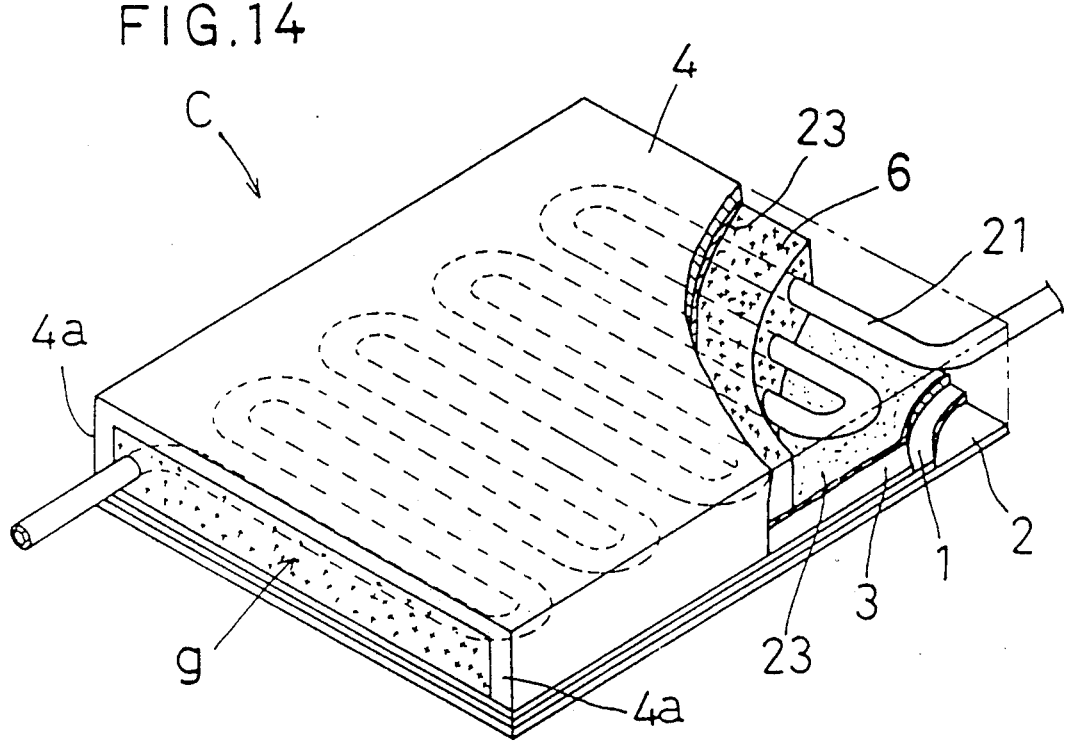
Figure 15:
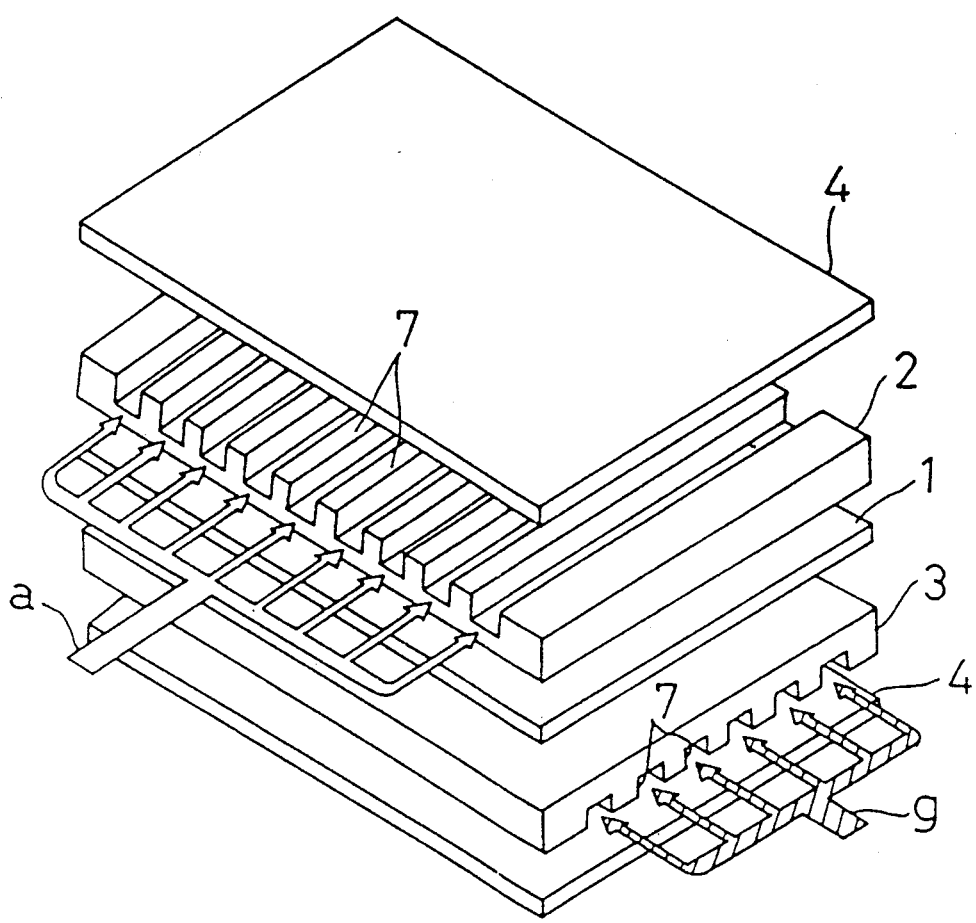
FIG. 15 is an exploded perspective view showing a fuel cell of the prior art.

A further alternate cell construction will be described next with reference to FIG. 14.

In this alternate cell construction, the separator 4 is attached only to the fuel electrode 3 and the fuel flow passage 'g' is formed between the fuel electrode 3 and the separator 4. The winding water-cooling pipe 21 is provided inside this fuel flow passage 'g'. And, the interposing member 6 of Ni or the like is also provided inside the passage 'g'. The interposing member 6 is affixed to the fuel electrode 3 and to the separator 4 by means of the high-temperature resistant adhesive 23 such as of ceramics material. This interposing member 6 serves to retain the water-cooling pipe 21 and also to promote heat conduction from the fuel electrode 3 to the water-cooling pipe 21, whereby there is formed an electricity passage having a large cross sectional area from the fuel electrode 3 to the separator 4 acting as a cell terminal.

The separators 4 can be attached to both the oxygen electrode 2 and the fuel electrode 3. In this case, the water-cooling pipe 21 and the conductive member 5 are provided in the oxygen-containing gas flow passage 5 and the fuel flow passage 'g'.

It is also conceivable to provide a plurality of the water-cooling pipes 21 in the oxygen-containing gas flow passage 'a' or in the fuel flow passage 'g'.

In a modified construction, a plurality of cells C each forming the oxygen-containing gas flow passage 'a' or the fuel flow passage 'g' with the separator 4, are laterally oriented and positioned one on another to form the fuel flow passage 'g' or the oxygen-containing gas flow passage 'a' inside the assembly. Whereas, between adjacent cells C, there is formed the fuel flow passage 'g' or the oxygen-containing gas flow passage 'a'.

The band-shaped ridge 4a of the separator 4 can be affixed to the plate type electroltye layer 1. Further, in the separator 4, the flat plate like main portion and the ridges 4a can be formed separately from each other.

The conductive member 5 or 6 in the cell C can be eliminated.

The specific constructions of the feed and exhaust passages for the oxygen-containing gas flow passage 'a' and the fuel flow passage 'g' can vary conveniently.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A solid electrolye fuel cell comprising:
   an electrolyte layer;
   an oxygen electrode attached to one face of said electrolyte layer;
   a fuel electrode attached to the other face of said electrolyte layer;
   a separator formed of electrically conductive material and disposed in opposition to said oxygen electrode to be electrically connected therewith;
   an oxygen-containing gas flow passage formed between said oxygen electrode and said separator;
   said separator integrally including band ridges at opposed side edges thereof, said band ridges sealing side edges of said oxygen-containing gas flow passage so that an entire periphery of the cell construction along said oxygen-containing gas flow passage is formed as a fuel flow passage separated from said oxygen-containing gas flow passage; and a conductive member formed of flexible material and provided separately from said separator in one of said oxygen-containing gas flow passage and fuel flow passage.

2. A fuel cell as defined in claim 1, wherein said electrolyte layer is formed as a plate member while said oxygen electrode and said fuel electrode are formed as a film or plate member, respectively.

3. A fuel cell as defined in claim 1, wherein said conductive member comprises a felt type member formed of one or two of the group consisting of La compound, Ni-based alloy and Co-based alloy.

4. A fuel cell as defined in claim 3, wherein said La compound comprises $LaMnO_3$.

5. A fuel cell as defined in claim 2, wherein said electrolyte layer is formed of $ZrO_2$ with solid solution of Yt.

6. A fuel cell as defined in claim 2, wherein said oxygen electrode is formed of $LaMnO_3$.

7. A fuel cell as defined in claim 2, wherein said fuel electrode is formed of cermet of Ni and $ZrO_2$.

8. A solid electrolyte fuel cell comprising:
an electrolyte layer;
an oxygen electrode attached to one face of said electrolyte layer;
a fuel electrode attached to the other face of said electrolyte layer;
a separator formed of electrically conductive material and disposed in opposition to said fuel electrode to be electrically connected therewith;
a fuel flow passage formed between said fuel electrode and said separator;
said separator integrally including band ridges at opposed side edges thereof, said band ridges sealing side edges of said fuel flow passage so that an entire periphery of the cell construction along said fuel flow passage is formed as an oxygen-containing gas flow passage separated from said fuel flow passage; and a conductive member formed of flexible material and provided separately from said separator in one of said fuel flow passage and said oxygen-containing gas flow passage.

9. A fuel cell as defined in claim 8, wherein said electrolyte layer is formed as a plate member while said oxygen electrode and said fuel electrode are formed as a film or plate member, respectively.

10. A fuel cell as defined in claim 8, wherein said conductive member comprises a felt type member formed of Ni.

11. A fuel cell as defined in claim 9, wherein said electrolyte layer is formed of $ZrO_2$ with solid solution of Yt.

12. A fuel cell as defined in claim 9, wherein said oxygen electrode is formed of $LaMnO_3$.

13. A fuel cell as defined in claim 9, wherein said fuel electrode is formed of cermet of Ni and $ZrO_2$.

14. A fuel cell as defined in claim 1, wherein said oxygen-containg gas flow passage or said fuel flow passage includes therein a water-cooling pipe.

15. A fuel cell as defined in claim 14, wherein said water-cooling pipe has a winding shape.

16. A fuel cell as defined in claim 15, wherein said water-cooling pipe is surrounded by said flexible conductive member.

17. A fuel cell as defined in claim 1 wherein said conducting member is disposed in said oxygen-containing gas flow passage.

18. A fuel cell as defined in claim 8 wherein said conductive member is disposed in said fuel flow passage.

* * * * *